May 16, 1967 F. L. CHURCHMAN ETAL 3,319,581
MONORAIL
Filed Nov. 25, 1964 3 Sheets-Sheet 2

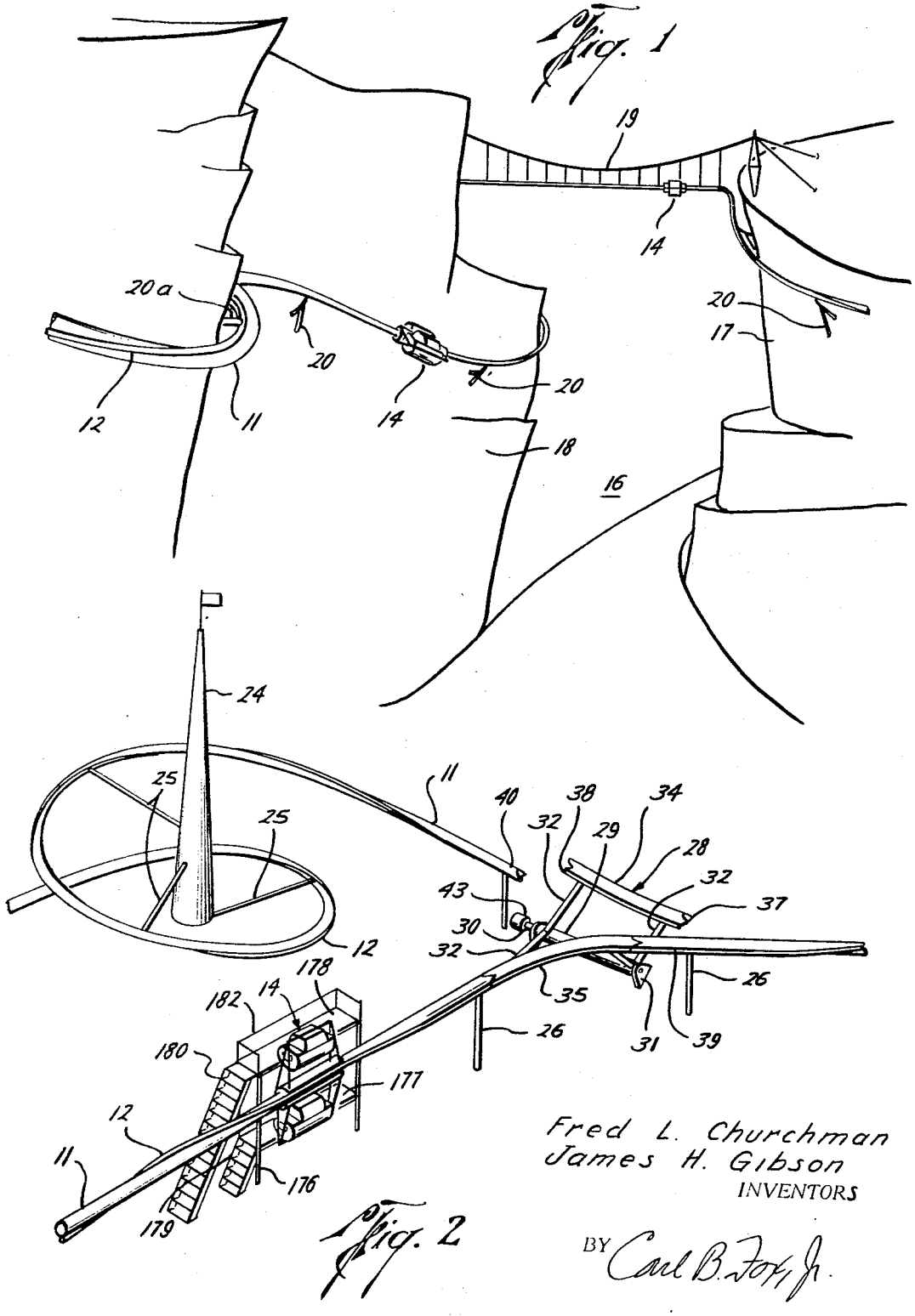

Fred L. Churchman
James H. Gibson
INVENTORS

BY Carl B. Fox, Jr.
ATTORNEY

May 16, 1967    F. L. CHURCHMAN ETAL    3,319,581
MONORAIL
Filed Nov. 25, 1964    3 Sheets-Sheet 3
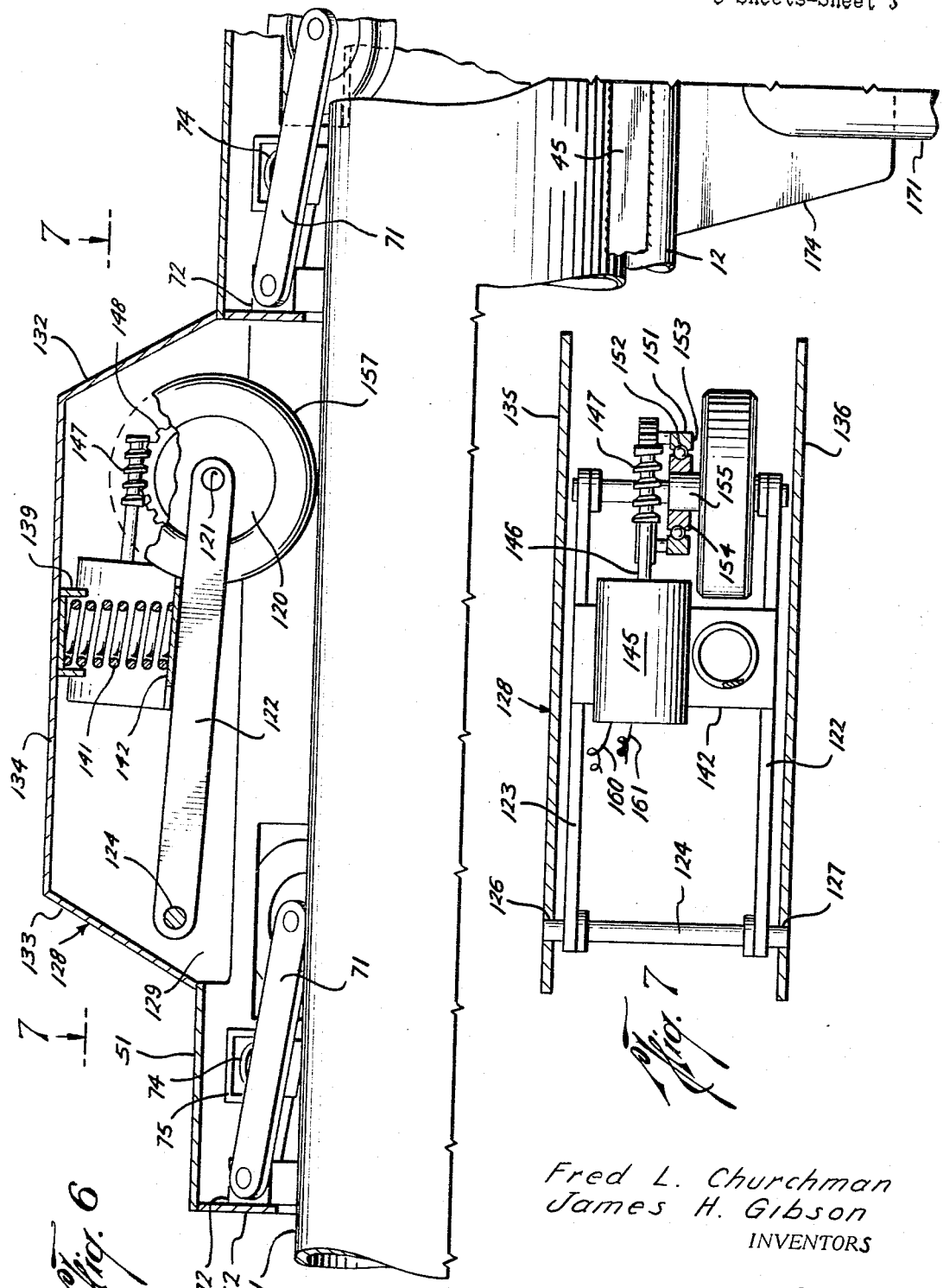
Fred L. Churchman
James H. Gibson
INVENTORS
BY Carl B. Fox, Jr.
ATTORNEY United States Patent Office 3,319,581
Patented May 16, 1967

3,319,581
MONORAIL
Fred L. Churchman, Rte. 1, De Ridder, La. 70634, and James H. Gibson, P.O. Box 534, San Pablo, Calif. 94806
Filed Nov. 25, 1964, Ser. No. 413,899
5 Claims. (Cl. 105—141)

This invention pertains to apparatus for use in transporting persons and/or objects, and particularly to monorail vehicular apparatus of the type wherein a single track or rail is provided along which one or more vehicles is supported and propelled.

A principal object of the invention is to provide monorail apparatus of simple yet dependable design, and which is safe and economical in construction and use.

Another principal object of the invention is to provide monorail apparatus useful for transportation of persons and objects, and which may be adapted for sightseeing and amusement purposes. According to this object, the apparatus may be provided for short or long distance transportation, for scenic tours of gorges or canyons or mountains, or the like, or for amusement rides in amusement parks, or the like.

Another object of the invention is to provide monorail apparatus adapted for spiralling movement along and about the single track or rail.

Briefly, the apparatus provided according to the invention includes an elongate main track or rail, preferably of circular cross-section, along which is provided a guide rail which may be at any side of the main track or rail and which may be disposed in a helical spiral along the main track or rail. The vehicle is mounted about the main track and the guide rail establishes and maintains the azimuthal position of the vehicle with respect to the main track and with respect to the ground. Each vehicle includes mutually balancing compartments at each side of the track, so that the vehicles have stability surpassing that of other monorail apparatus. In one preferred embodiment, wherein the apparatus is adapted for use as a scenic conveyance or as a "thrill" ride in an amusement park, for example, the vehicle rotates spirally about the track as it moves along the track, the compartments either remaining upright or turning over as the vehicle rotates about the track, and either way producing immense thrills and delights to the occupants of the vehicle or vehicles.

While in monorail apparatus heretofore known the track or rail has been universally disposed above ground level, and it is contemplated that the track or rail of the apparatus herein disclosed will likely most often be disposed above ground level, it is here pointed out that the track or rail of the apparatus herein disclosed can also be mounted upon the ground, with no elevated structures for supporting the track being required, so that the apparatus may be used for ground transportation as well as for elevated transportation.

Other objects and advantages of the invention will appear from the following detailed descriptions of preferred embodiments of the invention, reference being made to the accompanying drawings, of which:

FIG. 1 is a perspective view showing the apparatus provided by the invention disposed within a canyon, or the like, the showing being at least partially schematic;

FIG. 2 is a perspective view showing a track layout possible according to the invention, and switch apparatus for the track;

FIG. 6 is a partial elevation, partially in vertical cross-section, showing the drive wheel assembly and track support structure; and, FIG. 7 is a partial horizontal cross-section taken at line 7—7 of FIG. 6.

Figure 3:
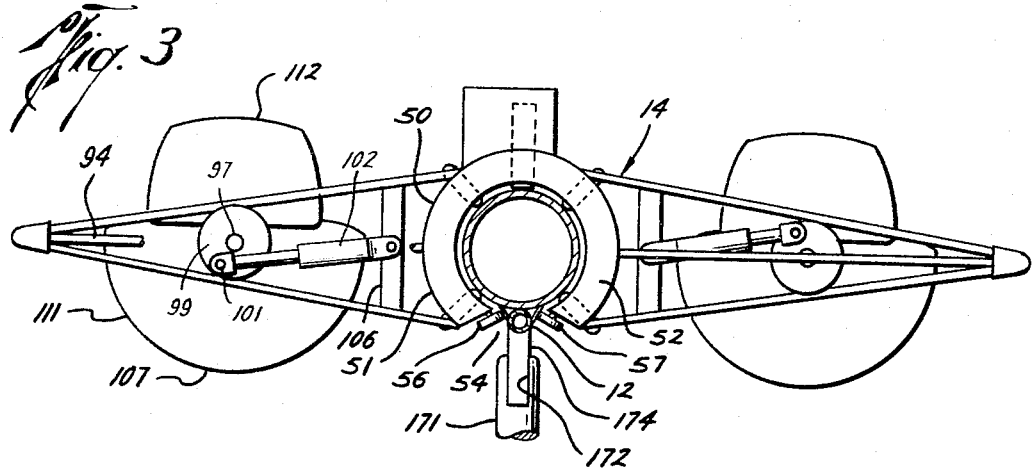
FIG. 3 is a front elevational view of a preferred embodiment of vehicle and track according to the invention.
Figure 4:
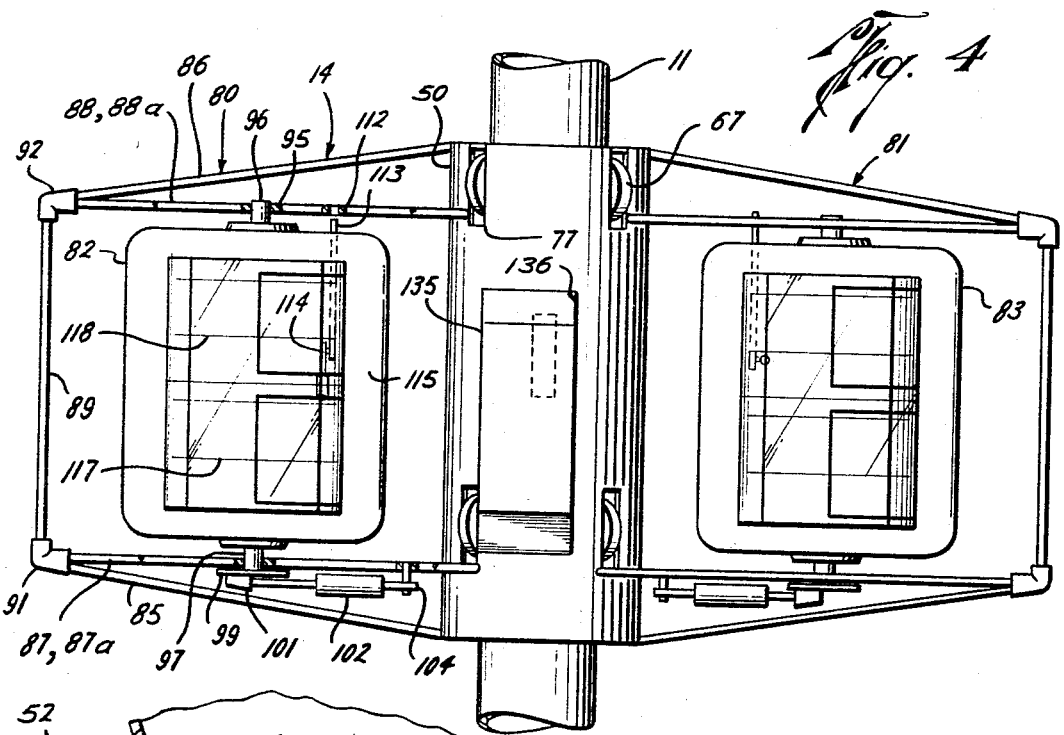
FIG. 4 is a plan view of the apparatus embodiment shown in FIG. 1.

Referring now to the drawings in detail, and first to FIGS. 1 and 2 of the drawings, there are shown elongate tracks 11 along which are carried the guide rails 12. One or more monorail cars 14 are supported on the track and propelled therealong. In FIG. 1 of the drawings, the track 11 is shown extending along the walls of a canyon or gorge 16, the walls being indicated by reference numerals 17, 18. A suspension bridge 19 supports the track across the upper part of canyon 16. The track is supported away from the walls 17, 18 of canyon 16 by a plurality of support members 20 and 20a. The support members may be alike or different depending upon the location and type of earth formation from which they are to depend. For example, the support members indicated by reference numerals 20 are shown as multiple-element V-shaped frame assemblies, the ends of each frame member being embedded and affixed into the earth at the side of the canyon. On the other hand, the support member indicated by reference numeral 20a is in the form of a single bar-like member extending from the track to the wall and the end thereof being embedded in the wall, for example, by concreting the end of the member into a hole into the wall.

Bridge 19 may take any form, suspension or not, and a truss type of supporting bridge for the track would serve equally well. It will be noted in FIG. 1 that the guide rail 12 at some portions of its length is in the form of a helical spiral about the track 11, and at other portions of the length of track 11 is above, or below, or to a side of the track 11.

In FIG. 2 of the drawings, the track 11 is indicated at the upper left hand side of the drawing figure in the form of an open loop about a support standard 24. A plurality of columnar members 25 extend outward from the column to support the track. At the lower portions of FIG. 2, the track is shown supported by a plurality of upstanding vertical columns 26, the lower ends of which may be firmly coupled to the ground in any suitable manner.

Also shown in FIG. 2 is a switch strutcure 28 wherein a rotary tube or shaft 29 is mounted in pivot supports 30, 31 at its ends for pivotal motion about its axis. A plurality of support beams or columns 32 extends outwardly from shaft 29 to movable track sections 34, 35, each of which has bevelled end portions 37, 38 adapted to interlock with similarly formed end portions of the main sections of track. It will be understood that movable track sections 35 may be removed by rotation of shaft 29 to bring movable track section 34 into engagement between track ends 39, 40 to interlockingly connect therewith. Therefore, the right hand branch of track 11 may be selectively and interchangeably connected to either of the left hand sections of track 11. Switch 28 may be powered by a suitable motor 43 connected to an end of shaft 29, or may be moved by hand if desired. The bevelled interlocked track ends may be maintained in place by any suitable locking or latching mechanism (not shown), or the bevelled track ends may be replaced by suitable locks or latches of other suitable forms.

Figure 5:
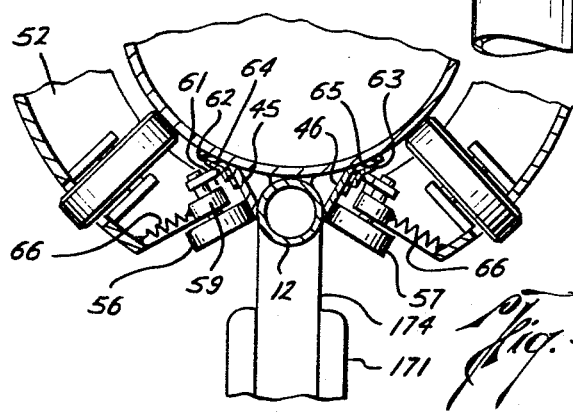
FIG. 5 is an enlarged partial vertical cross-sectional view showing lower engagements of the apparatus of FIGS. 3 and 4 with the track.

It is seen in FIGS. 1 and 2 of the drawings that the cars 14 are mounted on and move along the track in positions such that the guide rail 12 is always at the underside of the car. Referring now especially to FIGS. 3 through 7 of the drawings, each car 14 (only one such car being shown in FIGS. 3 through 7) is supported upon the track 11. As shown in these drawings, the track 11 is of tubular relatively thin-walled metal structure. The track is of uniform inner and outer cross-section throughout its length. The fact that the track is shown having a hollow interior is of no importance and it will be realized that a track of reinforced concrete or other structural material without an interior hollow will provide the requirements of the invention equally suitably. The guide rail 12 is also shown to be of tubular relatively thin-walled metal construction and this element may also take other forms, solid or hollow, as desired. It is desirable that the track 11 have a circular or cylindrical outer form, but guide rail 12 need not have such form. As shown in FIG. 5, the guide rail 12 is welded to track 11 and fillet plates 45, 46, usually flat, are welded to provide outwardly facing bevel surfaces to the sides of guide rail 12 and each extending from guide rail 12 to the outer surface of track 11 at points spaced from guide rail 12. The guide surfaces may alternatively be parallel. As has already been indicated, the term "guide rail" includes the entire structure of the pipe or tube 12 plus the plates 45, 46 employed to fill the space between the rail 12 and track 11.

Alternatively, it will be realized that the track and guide rail may be made as a single structure in any of the known manners of construction of such apparatus to provide the side guiding surfaces of the guiding rail structure and the support surface at the exterior of the track.

Each car 14 has a central body or fuselage 50 which, in the preferred embodiment shown, is formed of a partial cylindrical metal shell 51 strengthened by welded gusset or fillet plates 52 at or near the ends, and additional plates similar to plates 51, 52 being provided along the length of the fuselage as desired and as needed for strength. The fuselage is open at 54 along one side, the space of opening 54 being partially occupied by the guide rail 12 and by wheels 56, 57 which engage and roll upon the gusset surfaces 45, 46. Each guide wheel 56, 57 is rotatively supported upon an axle which is carried by a trailing support arm 59 pivotally connected at its opposite end to one of the gusset plates 52 of the fuselage. The arms 59 each carry bearing means so that the wheel axles may freely rotate without undue friction. At the opposite ends of the axles of guide wheels 56, 57, there are provided electrical contact members which slidingly engage electrical strips 62, 63, carried along insulating strips 64, 65 mounted along the angle between each of the gusset plates 45, 46 with track 11. The electrical contacts 61 may have rollers or slide devices for engaging the electrical strips so that excessive wear does not occur, as will be known to those skilled in the art.

The arms 59 for supporting the guide wheels are in the form of elongate bars, the opposite end of such bar being pinned to a bracket welded to one of the gussets 52. A coil spring 66 is provided acting between the arm 59 and the interior surface of fuselage web 51 in order that the guide wheels will each be resiliently biased toward the gusset plate upon which it rolls.

The fuselage is mounted upon the track by a plurality of support wheels 67, eight support wheels being shown, four being circularly spaced about the front end of the fuselage and four being circularly spaced about the rearward end of the fuselage. Each of these support wheels is mounted on a support arm or frame 71 carrying the support wheel in bearing journals at one end and being pivotally connected to a bracket 72 welded or otherwise affixed to one of the gusset members 52. A coil spring 74 engages a side of each arm 71 and a plate 75 affixed to the interior of shell 51 in order that all of the support wheels are resiliently biased toward the track. Thus, the fuselage is mounted about the track in spaced relation therewith, and the support wheels which mount the fuselage on the track are spring mounted in order that the fuselage will be cushioned against shock during its travel along the track. As will have been observed, each support wheel 67 extends partially through an opening 77 through the fuselage. If desired, the fuselage may be made of larger diameter or the wheels may be of smaller size so that the support wheels may be entirely within the fuselage.

The support wheels support the fuselage as it moves along the track, and the guide wheels 56, 57 orient the fuselage azimuthally with respect to the location of the guide rail along the track. Thus, when the guide rail spirals to a location different with respect to the vertical, the fuselage will be turned by the guide wheels rotatably about the track to assume a non-vertical aspect with regard to the zenith.

The cars 14 have mounted upon their fuselage 50 oppositely disposed frames 80, 81. The outrigger frames 80, 81 are mirror image structures to either side of the fuselage for supporting the chambers or compartments 82, 83, in which the passengers ride or in which cargo may be carried. Each frame 80, 81 includes an angular forward member 85, a similarly angular rearward member 86, and paired forward members 87, 87a, and paired rearward members 88, 88a. The front and rear frame members are connected at their outer ends by a longitudinal member 89. All of these frame members are preferably in the form of pipes or bars, of metal, the inner ends of the members 85, 86, 87 87a, 88 and 88a being welded or otherwise secured to the fuselage and the outer ends thereof being fitted into sockets of members 91, 92 which are also adapted to receive the respective ends of member 89. The members 91, 92 have their socket formations disposed in directions to receive the pipe or bar portions of the frame and to effect an angle connection between member 89 and the forward and rearward frame members. Between the angular forward and rearward members 87, 87a, 88 and 88a there is a horizontal frame member 94 which intermediate its length carries a bearing 95 receiving the shaft or pivot 96 or 97 of the compartment 82 or 83. The front shaft 97 of each compartment has affixed thereto a circular plate 99 non-concentrically of which there is connected one end 101 of a shaft of a hydraulic cylinder assembly 102 is pinned at 104 to a vertical brace member 106 extending between the frame members 87, 87a or 88, 88a and the central frame member 94.

As will be apparent, the compartments 82, 83 may rotate about their shafts or pivots 96, 97 as the car is rotated about the track. The compartments 82 are heavier at their lower sides 107 so that they tend to turn in their mounting pivots and remain upright regardless of the position of the car on the track. The hydraulic cylinder assembly 102 dampens the rotation of each compartment with respect to the fuselage and the remainder of the car so that the compartments do not swing to and fro haphazardly but tend to move slowly to the position dictated by the balance of the compartment.

Each compartment 82, 83 has an enlarged lower portion 111 and a reduced upper portion 112, the portions 111 generally being constructed of an opaque metal material while the upper portion of the cars 112 are preferably of a transparent material such as glass or a plastic material, the latter being preferred. Each compartment has one or more doors 114, 115 which preferably terminate upward at the center of the top of the compartment and which terminate downward at a level low enough to enable the passengers to enter the cars and repose upon the seats 117, 118 without difficulty.

Each of the rearward members 94 carries, between the pivot 96 or 97 and the fuselage, a perforated receptacle 112 adapted for receiving a shaft 113 actuated by a hand lever 114. When hand lever 114 is operated to engage shaft 113 in receptacle 112, the compartment becomes affixed to the frame rigidly and does not rotate with respect to the frame and fuselage when the car is moved to an angular position different from the normal horizontal position of the car. When the compartment is thus affixed to the frame to prevent rotation of the compartment, the occupants of the compartment may be, at their own choice, subjected to movements and positions of the fuselage, instead of having the compartment remain upright so that they are not subjected to such movement. Seat belts for the seats 117, 118 (not shown) will almost necessarily have to be provided in apparatus wherein this type of compartment movement is possible in order to prevent the occupants from being thrown against the more or less weak upper surfaces of the compartment.

Referring now especially to FIGS. 6 and 7 of the drawings, a drive wheel 120 is rotatably mounted upon shaft 121 at the end of the trailing arms or bars 122, 123. The opposite ends of the bars 122, 123 are secured on a cross shaft 124 which runs between the opposite members 122, 123, shaft 124 being mounted at 126, 127 of upstanding shell 128 outwardly enclosing opening 129 in fuselage plate member 51. The outwardly disposed extension of the fuselage 128 is made up of front plate 132, rear plate 133, top plate 134, and side plates 135, 136, welded or otherwise assembled to form the shell. A dished spring retainer 139 carried by plate 134 retains one end of helical compression spring 141, the other end of which is disposed against a plate 142 affixed across the space between arm members 122, 123. Spring 141 being under compression, urges bars 122, 123 downwardly to urge drive wheel 120 into firm engagement with the exterior of the track 11.

Also mounted upon cross support plate 142 is an electric drive motor 145, the shaft 146 of which is coupled to a worm gear 147. Worm gear 147 is engaged with ring gear 148 which has connected at one side a torsion ring 151 having torsion springs 152. The outer portion 153 of the torsion ring, in the form of an encircling ring is resiliently connected by springs 152 to the inner portion 154 carried on shaft 155, or axle, on which wheel 120 is mounted. Wheel 120 has tire 157 disposed therearound.

When motor 145 is operated (in either direction if the motor is reversible), wheel 122 is rotated to drive the vehicle along track 11. Preferably, motor 145 is a D.C. motor, but may be an A.C. motor. Use of a D.C. motor enables use of the motor as a braking means for the vehicle by reversal of the energizing current. Other forms of brakes may be employed to frictionally engage the track or a brakeband on one of the wheels. Conductors 160, 161 lead to the contacts 61 at guide wheels 56, 57. Therefore, motor 145 is energized by electrical current flowing thereto through conductors 160, 161 supplied from the electrical contact strips 62, 63 disposed longitudinally along the track. The control of the vehicle may be by suitable controls located in the vehicle and/or at a station along track 11.

As has been heretofore indicated the track may be supported in any suitable manner depending upon the terrain and conditions imposed for the support. Since the compartments 82, 83 do not extend to a great distance beneath the track, the track may be supported directly upon the ground. The track must be supported by supports connected to the guide rail. In the preferred embodiment of apparatus shown and described, the track will at most places be supported by columns 171 (which supplant the supports 20, 25 of FIGS. 1 and 2). The columns 171 are vertical columns each having a slot opening across its upper end into which is disposed a plate or structure 174 which may be fabricated of a single metal plate or may be of a box construction of plural metal plates. The member 174 is welded in place to the column, and extends forward and rearward along the track to some distance from the column in order to reinforce the support of the track. The end of the member 174 contacting the guide rail is welded or otherwise secured to the side of the guide rail away from the track. The lower end of the column may be supported in any suitable conventional manner; for example, the lower end may be bolted to or embedded in a concrete foundation block firmly installed in the earth.

Referring to FIG. 2, there is shown one possible structure for unloading and loading of the vehicle. A frame 176 supports lower platform 177 and upper platform 178. Stairs 179, 180 lead from the ground to the platforms. Hand rails 182 prevent passengers from falling from the platforms. A car 14 is shown disposed with the frames in vertical positions so that one compartment is at platform 177 and the other compartment is at platform 178. In this way, the frames are out of the way to prevent hindrance to occupancy of the cars and the passengers may readily step into or from the chambers on unloading or loading thereof. Loading and unloading areas to horizontally opposite sides of the track may, of course, be used, and in this event the compartment doors may be at the outer side of each compartment.

While a preferred embodiment of the invention has been shown and described, many modifications thereof may be made by a person skilled in the art without departing from the spirit of the invention, and it is intended to protect by Letters Patent all forms of the invention falling with the scope of the following claims.

What is claimed is:

1. Monorail apparatus, comprising track means having a uniform circular exterior cross-sectional configuration, a single guide rail means extending along a side of the exterior of said track means, monorail vehicle means comprising arcuate body means spacedly surrounding said track means from one side of said guide rail means around said track means to the other side of said guide means whereby said guide rail means is disposed in a gap along the lower side of said arcuate body means, laterally extending frame means depending from each side of said body means each spaced from the gap of said body means in which said guide rail means is disposed, compartment means carried by each said frame means, said frame means and compartment means being balanced at opposite sides of said arcuate body means, plural wheel means carried by said body means engaging said track means for movably supporting said body means moving along said track means, driven wheel means carried by said body means engaging said track means for propelling said body means along said track means, and guide wheel means carried by said body means engaging opposite sides of said guide rail means for maintaining the azimuthal position of said body means around said track means with respect to the azimuthal location of said guide rail means on said track means.

2. Combination of claim 1, said guide rail means being disposed generally along the lower side of said track means.

3. Combination of claim 1, said guide rail means being disposed helically around said track means along the length of said track means.

4. Combination of claim 1, said guide rail means having longitudinal portions disposed generally along the lower side of said track means, having other longitudinal portions along other sides of said track means than the lower sides thereof, and having connecting portions between said described longitudinal portions disposed helically along said track means.

5. Combination of claim 1, said frame means at each side of said body means each including pivotal support means for supporting one of said compartment means, each said compartment means having forward and rearward means pivotally engaging said pivotal support means, the center of gravity of each said compartment means being beneath a line connecting said forward and rearward means whereby said compartment means remain upright regardless of the azimuthal position of said body means around said track means.

References Cited by the Examiner

UNITED STATES PATENTS

| | | | |
|---|---|---|---|
| 814,939 | 3/1906 | Cerruti | 104—74 |
| 836,995 | 11/1906 | Schroeder | 104—118 |
| 2,498,450 | 2/1950 | Pewitt | 104—76 |
| 2,920,581 | 1/1960 | Cook et al. | 104—93 |
| 3,092,039 | 6/1963 | Lich | 104—93 X |

FOREIGN PATENTS 243,599  12/1925  Great Britain.

ARTHUR L. LA POINT, *Primary Examiner.*

J. E. BABER, *Assistant Examiner.*